Oct. 27, 1931.  G. GHISELLI  1,828,929
TRACTOR ATTACHMENT
Filed Aug. 3, 1929
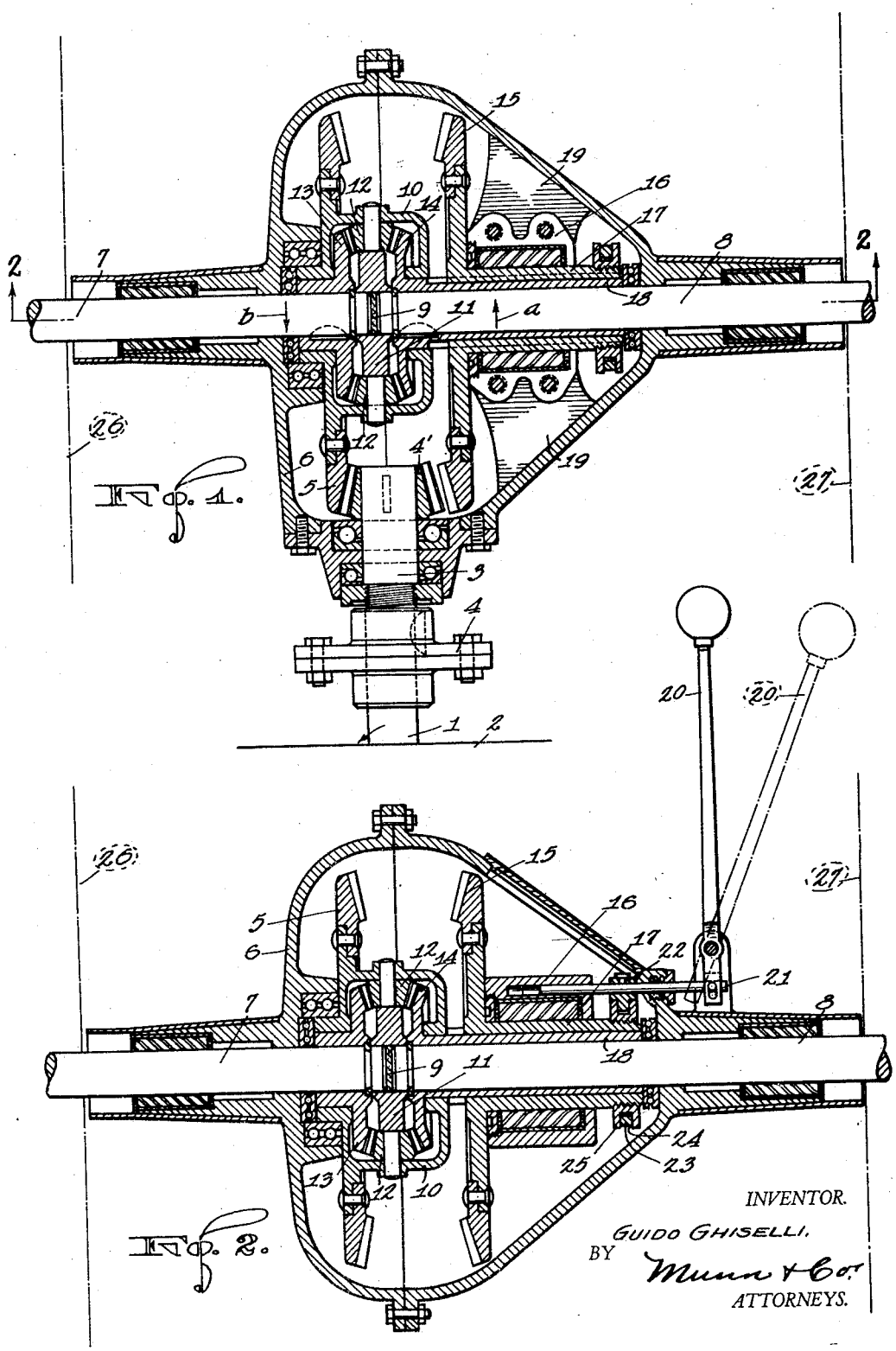
INVENTOR.
GUIDO GHISELLI,
BY Munn & Co.
ATTORNEYS.

Patented Oct. 27, 1931

1,828,929

UNITED STATES PATENT OFFICE

GUIDO GHISELLI, OF SAN FRANCISCO, CALIFORNIA

TRACTOR ATTACHMENT

Application filed August 3, 1929. Serial No. 383,401.

My invention relates to improvements in tractor attachments, and it consists in the combinations, constructions and arrangements hereinafter described and claimed.

In standard tractors it is the practice to apply a braking force to one wheel when desiring to turn the tractor. The principal object of my invention is to cause the wheel making the outer turn to rotate forwardly and the one making the inner turn to rotate rearwardly. This will result in a quicker turning of the tractor.

The device still makes use of a differential so as to adapt it to the ordinary movements in a forward or a rearward direction. The opposite turnings of the wheels is accomplished only when the driver wishes to turn the tractor to the right or to the left.

A further object of my invention is to provide a device of the type described which is simple in construction and which is durable and efficient for the purpose intended. The device is designed especially for a tractor using an endless track-laying tread.

Other objects and advantages will appear as the specification proceeds, and the novel features of the device will be particularly pointed out in the claims hereto attached.

My invention is illustrated in the accompanying drawings, in which:

Figure 1 is a horizontal section through the device, and

Figure 2 is a section along the line 2—2 of Figure 1.

In carrying out my invention I make use of a drive shaft 1 that may be rotated in either direction by an engine (not shown) and by the arrangement of gears in a transmission indicated generally at 2. The shaft 1 rotates a stub shaft 3 by means of a universal joint 4 or other suitable connection. The shaft 3 carries a bevel gear 4', and the bevel gear meshes with a master gear 5. The gears 4' and 5 are housed within a casing 6, and this casing supports rear axles 7 and 8. A fiber washer 9 is placed between the abutting ends of the axles 7 and 8.

The master gear carries a differential cage 10, and this cage carries a differential spider 11. The spider in turn carries small bevel gears 12 that mesh with bevel gears 13 and 14 keyed to the axles 7 and 8 respectively. The parts thus far described are standard and form no part of my invention except insofar as they cooperate with the parts now to be described.

The right hand side of the casing 6 in Figure 1 is enlarged over the standard casing so as to house a ring gear 15 and a bearing 16. The ring gear 15 has an integral sleeve 17 that is feathered on a sleeve 18 that is integral with the gear 14. As already stated, the gear 14 is keyed to the shaft 8, and it will therefore be seen that the ring gear 15 is also keyed to the same shaft. The sleeve 17 is supported by the roller bearing 16, and the bearing in turn is carried by webbing 19 that extends to the casing 6.

Means is provided for causing the ring gear 15 to mesh with the gear 4' when it is desired to rotate the shaft 7 in one direction and the shaft 8 in the opposite direction. When the gear 15 is out of mesh with the gear 4', the parts will function as a standard differential. In Figure 2 I show a manually-controlled lever 20 that is designed to move a rod 21 in either direction along its longitudinal axis. A ring 22 is rigidly secured to the rod 21 and has an inwardly-extending flange 23 that is rotatably received in an annular groove 24 of a collar 25. The collar is threaded on the sleeve 17 and is designed to move the sleeve longitudinally on the sleeve 18 when the lever 20 is actuated.

From the foregoing description of the various parts of the device, the operation thereof may be readily understood.

The shaft 1 normally rotates to the left as shown by the arrow in Figure 1 when the tractor is going in a forward direction. I have indicated the endless track-laying members by the dotted lines 26 and 27 that are disposed at the ends of the shafts 7 and 8. If the operator wishes to turn the tractor quickly, he throws the lever 20 into the dotted line position shown in Figure 2. This causes the gear 15 to mesh with the gear 4'. If the shaft 1 is rotating in the direction shown by the arrow in Figure 1, the gear 15 will rotate the shaft 8 in the direction shown by the arrow $a$. This will cause the track-laying member 27 to move rearwardly. At the same time, the gear 5 will mesh with the gear 4' and will cause the shaft 7 to rotate forwardly as shown by the arrow $b$. This will cause a quick turning of the tractor to the left.

If the operator desires to turn the tractor to the right, he first shifts the gearing in the transmission 2 to cause the shaft 1 to rotate in the opposite direction from that shown by the arrow. A subsequent shifting of the lever 20 into the dotted line position will cause the shaft 7 and 8 to rotate in directions opposite to that already described. This will cause the tractor to turn to the right. The rod 21 is shown slidably mounted in the bearing housing 16.

Although I have shown and described one embodiment of my invention, I wish to have it understood that the same is susceptible of various changes, and I reserve the right to employ such changes as may come within the scope of the invention as claimed.

I claim:

1. The combination with a differential for a tractor connected to two driven shafts, a driving gear operatively connected to the differential, a gear having a sleeve slidably and non-rotatably mounted on one of said shafts, a bearing for supporting the sleeve, and means for moving the last named gear into and out of mesh with the driving gear, said means including a collar secured to the sleeve, a ring rotatable in the collar, a rod secured to the ring and being slidable in a recess in the bearing, and a lever connected to the rod for moving the rod in the direction of its length.

2. In combination, a differential housing, a shaft extending thereinto, a gear having a sleeve feathered to the shaft, a bearing for the sleeve and having a recess, a collar secured to the sleeve, a ring rotatably mounted in the collar, a rod connected to the ring and being slidable in the bore, said rod projecting exteriorly of the housing, and a gear shift lever operatively connected to the rod.

GUIDO GHISELLI.